United States Patent Office 3,654,203
Patented Apr. 4, 1972

3,654,203
PROCESS FOR PRODUCING AND NOVEL WATER-SOLUBLE SYNTHETIC RESINS
Wolfgang Daimer and Heinrich Lackner, Graz, Austria, assignors to Vianova Kunstharz Aktiengesellschaft, Vienna, Austria
No Drawing. Filed Apr. 21, 1969, Ser. No. 818,062
Claims priority, application Austria, May 2, 1968, A 4,216/68
Int. Cl. C08f 27/00, 47/16
U.S. Cl. 260—19 UA                                  18 Claims

ABSTRACT OF THE DISCLOSURE

Water-soluble synthetic resins are described comprising addition products of (1) polymers of dienes having a molecular weight of from 200 to 20,000; and (2) unsaturated carboxylic acids having at least 6 carbon atoms. The resins are substantially free of hydrolyzable groups and have an acid value of at least 40 mg. KOH/g. The resins are highly stable and have a low viscosity permitting the preparation of high solids protective coating compositions.

FIELD OF INVENTION AND PRIOR ART

This invention is directed to synthetic resins. More particularly, this invention is directed to synthetic resins which are water soluble but which are substantially free of hydrolyzable groups such as ester linkages. More specifically, the resins comprise addition products of (1) polymers of dienes having a molecular weight of from about 200 to about 20,000; and (2) unsaturated carboxylic acids having at least 6 carbon atoms; are substantially free of hydrolyzable groups and have an acid value of at least 40 mg. KOH/g.

A large number of water-soluble synthetic resins having oxidative drying properties are known in the protective coating art. These resins either contain ester linkages of natural triglycerides or synthetically produced condensation products, or are reaction products of polymers of dienes with maleic anhydride. The first group of these resins as a result of hydrolyzable groups are sensitive to saponification influences.

SUMMARY OF INVENTION

It has now been found that polymers of dienes free of, or substantially free of groups reactive with carboxyl groups to give hydrolyzable linkages can be reacted with fatty acids and/or rosin acids with isolated or conjugated double bonds which originate from natural oils or rosin and their derivatives, respectively. Upon neutralization of the carboxy groups, water-soluble synthetic resins with oxidative drying properties are obtained, whose basic structure exclusively contains C—C— linkages with no saponifiable groups, such as ester, ether or peptide groups. With the acid values required for producing water-soluble products, the viscosity of the products of the present invention is essentially lower than that of reaction products of diene polymers with maleic anhydride with analogous acid values. Thus, high solids content paints can be made from the products of the invention, containing only small amounts of solvents.

More specifically, the present invention is concerned with the preparation of and synthetic resins which are water soluble upon neutralization and whose basic structure does not contain linkages which can be hydrolyzed. The resins are characterized in that polymers of dienes with a molecular weight of from about 200 to about 20,000, and preferably about 200 to about 10,000, are reacted with unsaturated carboxylic acids with at least 6 carbon atoms to form a resin having an acid number of at least 40 mg. KOH/g. The resin is optionally co-polymerized with other polymerizable vinyl compounds.

The neutralization to obtain the water-soluble resins can be carried out in general at such temperatures at which the neutralizing agent is not too volatile. Therefore, it is no longer necessary to cool batches completely as is the case with known products and, thus, production time is shortened considerably when preparing the products of the invention. In neutralized form, the resins can be stored over any period, at any pH-value, without having the macro-molecules decompose. Thus, the instability on storage of prior art products is overcome with the products of this invention.

Coatings based on the resins of the present invention will form films with excellent hiding power and flow, since the resin molecules have aliphatic structure with long, or relatively long, chains. Furthermore, the films exhibit excellent corrosion resistance, which is due to the very fast oxidative drying and the unsaponifiable character of the resins. Corrosion resistance of the present products is much less dependent upon the type and quality of pre-treatment of the objects to be coated. Moreover, coatings based on the vehicles of the present invention can be applied by any method and can be processed with all common pigments and extenders.

In contradistinction to reaction products of polymeric dienes with maleic anhydride, the products of the present invention are very pale, and form dense films with very good adhesion and outstanding surface upon electrodeposition. With siccatives, paints which are air-drying can be obtained. Stoving paints made with the resins require considerably lower stoving temperatures.

Diene polymers suitable for the present process are polymers of 1,3-butadiene, 2-methylbutadiene-1,3, 2,3-dimethylbutadiene-1,3, chloroprene, and mixtures of these monomers as well as other monomers giving polymers which are free of hydrolyzable groups or groups which will react with a carboxyl group to give hydrolyzable linkages. The molecular weight of the polymers can range from 200 to 20,000, and preferably from 200 to 10,000, and substantially contain isolated double bonds and cis-configuration.

Suitable unsaturated carboxylic acids with one or more isolated or conjugated double bonds are lauraleic acid, myristoleic acid, palmitoleic acid, oleic acid, gadoleic acid, erucic acid, 9,12-linoleic acid, isanoc acid, 9,11-linoleic acid, linolenic acid, alpha-elaeostearic acid, alpha-licanic acid, arachidonic acid, clupanodonic acid, parinaric acid, chaulmoogric acid, etc., their isomers and dimers, mixtures of these acids, such as are contained in the saponification products and derivatives of the natural oils. Furthermore, rosin acids, such as abietic acids, alone or in admixture can be employed.

The reaction of the diene polymer and unsaturated carboxylic acid is an additional polymerization reaction. In the case of conjugated unsaturated carboxylic acids, it is a diene-synthesis. This reaction is carried out at temperatures above 50° C., optionally in the presence of catalysts, e.g., peroxides, azo-catalysts, bleaching earths. The skeleton of the macro-molecule contains exclusively C—C— linkages. The unsaturated carboxylic acids may undergo isomerizations during the reaction. The desired extent of reaction between the components is obtained when the reaction product becomes completely water soluble upon neutralization. Optionally, the reaction can be carried on the achieve a higher viscosity. After the end of the reaction, unreacted unsaturated fatty acids and saturated portions can be eliminated with vacuum or vapor.

The products of the invention can be modified in many ways, e.g., through co-polymerization with further vinyl monomers, such as styrene, alpha-methyl styrene, vinyl toluene, (meth)acrylic derivatives. This further co-polymerization can either be carried out during the reaction of the diene polymers with the carboxylic acids or subsequently thereto. Furthermore, the synthetic resins of the invention can be modified with condensation products of formaldehyde and phenols, phenol carboxylic acids, ureas, and aminotriazines, either in admixture or in chemical combination. Moreover, the products can be cross-linked with sulphur either with or without the co-employment of vulcanization catalysts.

Suitable bases for neutralizing the reaction products of diene polymers and unsaturated carboxylic acids are ammonia, primary, secondary, and tertiary amines, e.g., (iso)propylamine, butyl amine, amyl amine, diethyl amine, diisopropylamine, dibutyl amine, morpholin, piperidine, trimethyl amine, triethyl amine, as well as alkanol amines, such as diisopropanol amine, dimethylethanol amine, alkylene polyamines, e.g., ethylene diamine, triethylene tetraamine, and tetraethylene pentamine. Moreover, when using the compositions of the present invention for electrodeposition, as neutralizing agents there can be used alkali and/or alkali earth hydroxides and salts of an acid having a dissociation constant lower than that of the resins, as long as they form water-soluble products with the latter, optionally in the presence of water-tolerant solvents. Examples of suitable salts of such weakly dissociated acids are alkali carbonates, alkali carbamates, and the like. Through the use of such salt-forming agents, the conductivity of the electrodeposition baths is increased considerably, without reducing the resistance of the film. Consequently, the binding agent has a better throwing power which enables complicated objects to be coated uniformly without auxiliary electrodes.

For dilution of the resins, a large number of water-tolerant solvents are suitable, including low boiling alcohols such as methanol, ethanol, propanols, butanols; glycol monoethers such as ethylene glycol monomethylether, ethylene glycol monoethylether, ethylene glycol monoisopropylether, ethylene glycol monobutylether, as well as the mono- and di-ethers of diethyleneglycol; water-soluble ketones such as acetone, methylethyl ketone; diacetonalcohol; dioxane; dimethylformamide; dimethylsulfoxide, and the like.

DETAILED DESCRIPTION OF PREFERRED EMBODIMENTS

The following examples are for purposes of illustrating the invention without limitation thereof. Parts are by weight unless otherwise indicated.

Example 1

420 g. distilled dehydrated castor oil fatty acids containing at least 30 percent by weight of conjugated unsaturated fatty acids and 430 g. of a liquid polymer of 1,3-butadiene having a viscosity of 5 p./20° C. are heated together to a temperature of 280° C. The batch is stirred at this temperature until a sample of the resin, diluted to 70 percent non-volatile with ethylene glycol monobutylether and neutralized to a pH-value of 9 with triethyl amine, has become completely soluble in water. Then, at 280° C., traces of volatile substances are distilled off with a vacuum of at least 10 mm. Hg. The acid number of the resin is 100 mg. KOH/g., and it has a viscosity of 70 cp./20° C. (measured at a 66 percent non-volatile in ethylene glycol monoethyl ether acetate). At 60° C., the resin is mixed with triethyl amine and ethylene glycol monobutylether, so that a solids content of 70 percent and a pH-value of 8.5 (measured at a 10 percent by weight solution in distilled water) is obtained. The resin solution can be diluted with water to any desired extent.

Example 2

430 g. of a polymer of 1,3-butadiene with a viscosity of 5 p./20° C. are reacted according to Example 1 with a mixture of 252 g. of 9,12-linoleic acid and 155 g. oleic acid. The reaction time has to be increased somewhat to achieve dilutability with water. The further processing is analogous to Example 1.

Example 3

525 g. of a dimeric fatty acid with an acid number of 190 mg. KOH/g. and a viscosity of 4,000 cp./20° C., and 225 g. of polybutadiene with 80 percent cis-configuration and a viscosity of 5 p./20° C., are reacted according to Example 1. At the end of the reaction, the product is distilled at 250° C. with water vapor. The acid value is 130 mg. KOH/g. The resin is diluted to 70 percent non-volatile with ethylene glycol monobutylether and the pH-value is adjusted to 9 with 40 percent KOH. The resin solution can be diluted with water to any desired extent.

Example 4

525 g. of distilled dehydrated castor oil fatty acid with at least 30 percent by weight of conjugated unsaturated fatty acids are added to 325 g. of a liquid polymer of 1,3-butadiene having a viscosity of 5 p./20° C. at 270° C. over a period of three hours. The batch is held at 270° C. until the viscosity (66 percent non-volatile in ethylene glycol monoethylether acetate) has reached 2 p./20° C.

850 g. of this condensation product are heated to 200° C. and, within two hours, a mixture of 150 g. styrene and 1 g. di-tertiary butylperoxide are added on a continuous basis. The temperature is held at 200° C. until the viscosity has reached 6 p./20° C. (measured at a 66 percent non-volatile in ethylene glycol monoethylether acetate). Volatile portions are distilled off by vacuum or eliminated with inert gas. At 100° C., the resin is diluted with ethylene glycol monoethylether and triethylamine is added in order to obtain a 70 percent solids solution with a pH-value of 8.5 (measured at a 10 percent non-volatile in water).

For preparing a pigmented paint, 290 g. resin solution at 70 percent non-volatile are ground on a triple roll mill with 70 g. red iron oxide. The paste is made up to 2,000 g. with distilled water. If required, the pH-value is adjusted with triethyl amine to 8.5.

The paint is transferred into a 2 liter cylindrical metal container 15 cm. in diameter which is wired as a cathode of an electrodeposition unit. As the anode, a steel panel having a 200 cm.$^2$ surface is immersed into the bath. At 100 v., within one minute, a tough film will deposit which exhibits excellent hardness on stoving at 160° C. for 30 minutes, even without rinsing with water before curing. The film is hard, flexible, and shows extraordinary salt spray resistance.

Example 5

The resin of Example 4 is mixed with 20 percent hexamethoxymethyl melamine. Upon adequate pigmentation and dilution with water to a solids content of 30 percent non-volatile (resin and pigments), a paint is obtained which can be applied by flow coating, dipping, or spraying. The viscosity can be adjusted as required with small amounts of ethylene glycol monoethylether. On stoving for 30 minutes at already 140° C., the films exhibit an ideal combination of hardness, gloss, and flexibility.

Example 6

325 g. of a polymer of 1,3-butadiene and 525 g. dehydrated castor oil fatty acid are condensed as described in Example 3. The reaction product is mixed at 160° C. with 100 g. butylphenol resol (produced in known manner from 60 g. para tertiary butyl phenol and 90 g. formaldehyde, 36 percent). The batch is held at 60° C. until the viscosity has risen to 6 p./20° C. The resin is mixed with ethylene glycol monoethylether and concentrated ammonia to obtain a pH-value of 8.2 (measured at a 10 percent non-volatile in distilled water) and a solids content of 70 percent. This resin is admirably suited for electrodeposition in accordance with the process described in Example 4.

The polybutadiene in the above examples can be replaced by other diene polymers having a molecular weight of from about 200 to 20,000 and which are free of hydrolyzable groups or groups which will react with a carboxyl group to form a hydrolyzable group including polymers of 2-methylbutadiene-1,3,2,3-dimethylbutadiene-1,3, and chloroprene. Additionally, the carboxylic acid can be replaced with other carboxylic acids having one or more isolated or conjugated double bonds and having at least 6 carbon atoms including lauroleic acid, myristoleic acid, palmitoleic acid, oleic acid, gadoleic acid, erucic acid, 9,12-linoleic acid, isanic acid, 9,11-linoleic acid, linolenic acid, alpha-elaeostearic acid, alpha-licanic acid, arachidonic acid, clupanodonic acid, parinaric acid, chulmoogric acid, and rosin acids.

It is claimed:

1. The process for producing aqueous alkaline soluble synthetic resin compositions free, or substantially free, of hydrolyzable groups comprising
   (1) heating
      (a) a polymer consisting essentially of a diene polymer prepared from monomers selected from the group consisting of 1,3-butadiene; 2-methylbutadiene-1,3; 2,3-dimethylbutadiene-1,3; chlorprene and mixtures thereof having a molecular weight of from about 200 to about 20,000 and which is free, or substantially free, of hydrolyzable groups or groups which will react with a carboxyl group to form a hydrolyzable group, and
      (b) a carboxylic acid component consisting essentially of an unsaturated carboxylic acid having at least 6 carbon atoms selected from the group consisting of oil fatty acids, their isomers and dimers and mixtures thereof, and rosin acids alone or in mixture with the oil fatty acids, said components (a) and (b) being present in a quantity effective, upon reaction, to form a resin having an acid number of at least 40 mg. KOH/g.; and
   (2) neutralizing the product of (1) with an alkaline material in an aqueous medium to provide a water-soluble composition.

2. The process of claim 1 wherein the aqueous medium includes a water-tolerant organic solvent.

3. The process of claim 1 wherein the diene polymer has a molecular weight of from about 200 to about 10,000.

4. The process of claim 1 wherein the diene is a polymer of 1,3-butadiene.

5. The process of claim 1 wherein the unsaturated carboxylic acids contain from about 10 to 60 percent by weight of conjugated unsaturated fatty acids and/or rosin acids.

6. The process of claim 5 wherein the unsaturated carboxylic acids contain at least 30 percent by weight of conjugated unsaturated fatty acids and/or rosin acids.

7. The process of claim 1 wherein the product of (1) is co-polymerized with polymerizable vinyl compounds.

8. The process of claim 1 wherein the product of (1) is combined with an aldehyde condensation product of phenols; phenol carboxylic acids; ureas; and/or aminotriazines prior to neutralization.

9. An aqueous alkaline soluble synthetic resin comprising the addition product of
   (1) a polymer consisting essentially of a diene polymer prepared from monomers selected from the groups consisting of 1,3-butadiene; 2-methylbutadiene-1,3; 2,3-dimethylbutadiene; chlorprene and mixtures thereof having a molecular weight of from about 200 to about 20,000 and which is free, or substantially free, of hydrolyzable groups or groups which will react with a carboxyl group to form a hydrolyzable group; and
   (2) a carboxylic acid component consisting essentially of an unsaturated carboxylic acid having at least 6 carbon atoms selected from the group consisting of oil fatty acids, their isomers and dimers and mixtures thereof, and rosin acids alone or in mixture with the oil fatty acids, the ratio of the moiety of (1) and (2) in said addition product providing an acid number of at least 40 mg. KOH/g.

10. The synthetic resin of claim 9 wherein the diene polymer has a molecular weight of from about 200 to about 10,000.

11. The synthetic resin of claim 9 wherein the diene polymer is a polymer of 1,3-butadiene.

12. The synthetic resin of claim 9 wherein the unsaturated carboxylic acids contain from about 10 to 60 percent by weight of conjugated unsaturated fatty acids and/or rosin acids.

13. The synthetic resin of claim 12 wherein the unsaturated carboxylic acids contain at least 30 percent by weight of conjugated unsaturated fatty acids and/or rosin acids.

14. The synthetic resin of claim 9 wherein the addition product is co-polymerized with co-polymerizable vinyl compounds.

15. The synthetic resin of claim 9 wherein the addition product is combined with an aldehyde condensation product of phenols; phenol carboxylic acids; ureas; and/or aminotriazines.

16. The water-soluble composition comprising the addition product of claim 9 neutralized in an aqueous medium with an alkaline base.

17. The water-soluble composition of claim 16 wherein the aqueous medium includes a water-tolerant organic solvent.

18. The process for producing an aqueous alkaline soluble synthetic resin composition free, or substantially free, of hydrolyzable groups comprising heating
   (a) a polymer consisting essentially of a diene polymer prepared from monomers selected from the group consisting of 1,3-butadiene; 2-methylbutadiene-1,3; 2,3-dimethylbutadiene-1,3; chlorprene and mixtures thereof having a molecular weight of from about 200 to about 20,000 and which is free, or substantially free, of hydrolyzable groups or groups which will react with a carboxyl group to form a hydrolyzable group, and
   (b) a carboxylic acid component consisting essentially of an unsaturated carboxylic acid having at least 6 carbon atoms selected from the group consisting of oil fatty acids, their isomers and dimers and mixtures thereof, and rosin acids alone or in mixture with the oil fatty acids, said components (a) and (b) being present in a quantity effective, upon reaction, to form a resin having an acid number of at least 40 mg. KOH/g.

References Cited

UNITED STATES PATENTS

| | | | |
|---|---|---|---|
| 3,518,213 | 6/1970 | Miyoshi et al. | 204—181 X |
| 3,489,704 | 1/1970 | Dunham et al. | 260—23.7 |
| 3,483,152 | 12/1969 | Koch | 260—23.7 |
| 3,404,079 | 10/1968 | Boardman | 204—181 |
| 3,279,975 | 10/1966 | Yoshii | 260—78.4 X |
| 3,230,162 | 1/1966 | Gilchrist | 204—181 |
| 2,634,256 | 4/1953 | Sparks et al. | 260—78.4 |
| 3,544,497 | 12/1970 | Guerrier | 260—23.7 |

FOREIGN PATENTS

| | | | |
|---|---|---|---|
| 1,495,570 | 9/1967 | France | 260—23.7 |
| 1,152,509 | 5/1969 | Britain | 260—23.7 |

DONALD E. CZAJA, Primary Examiner

C. W. IVY, Assistant Examiner

U.S. Cl. X.R.

204—181; 260—21, 23.7 A, 27, 29.3, 29.4, 29.7 H, 28.4 D